United States Patent
Huang et al.

(10) Patent No.: US 9,516,664 B2
(45) Date of Patent: Dec. 6, 2016

(54) METHOD, APPARATUS, AND SYSTEM FOR CORRECTING RECEIVING AND SENDING CHANNEL RESPONSE, AND BBU

(71) Applicant: Huawei Technologies Co., Ltd., Shenzhen, Guangdong (CN)

(72) Inventors: Hui Huang, Shenzhen (CN); Tianxiao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 14/660,630

(22) Filed: Mar. 17, 2015

(65) Prior Publication Data
US 2015/0189669 A1    Jul. 2, 2015

Related U.S. Application Data

(63) Continuation of application No. PCT/CN2012/087409, filed on Dec. 25, 2012.

(30) Foreign Application Priority Data

Sep. 17, 2012  (CN) .......................... 2012 1 0345419

(51) Int. Cl.
*H04W 72/10* (2009.01)
*H04B 7/02* (2006.01)
*H04L 5/00* (2006.01)

(52) U.S. Cl.
CPC ............. *H04W 72/10* (2013.01); *H04B 7/024* (2013.01); *H04L 5/0035* (2013.01)

(58) Field of Classification Search
CPC ........... H04B 7/005; H04B 7/02; H04B 7/024; H04B 7/04; H04B 17/00; H04W 72/10; H04L 1/00; H04L 5/00; H04L 5/0035
See application file for complete search history.

(56) References Cited

U.S. PATENT DOCUMENTS

2004/0228417 A1  11/2004  Kennedy et al.
2009/0129497 A1*  5/2009  Stopler ............... H04L 25/0204
                                                    375/267
(Continued)

FOREIGN PATENT DOCUMENTS

CN        1571534 A     1/2005
CN      101562504 A    10/2009
(Continued)

OTHER PUBLICATIONS

"Antenna Array Calibration for TDD CoMP", Alcatel-Lucent Shanghai Bell, 3GPP TSG RAN WG1 Meeting #59bis, Jan. 18-22, 2010, 5 pages.
(Continued)

*Primary Examiner* — Tri H Phan (57) ABSTRACT

Embodiments of the application disclose a method, an apparatus, and a system. The method includes: taking a first receiving and sending channel as a reference correction channel in a first radio frequency module, correcting a channel response ratio of each receiving and sending channel in the first radio frequency module, so that the channel response ratio of each receiving and sending channel in the first radio frequency module is consistent with a channel response ratio of the first receiving and sending channel; taking the first receiving and sending channel and a second receiving and sending channel as correction channels of the first radio frequency module and a second radio frequency module, correcting a channel response ratio of the second receiving and sending channel, so that the channel response ratio of the second receiving and sending channel is consistent with the channel response ratio of the first receiving and sending channel.

20 Claims, 4 Drawing Sheets

A first BBU takes a first receiving and sending channel as a reference correction channel in a first RRU, and corrects a channel response ratio of each receiving and sending channel in the first RRU, so that the channel response ratio of each receiving and sending channel in the first RRU is consistent with a channel response ratio of the first receiving and sending channel — 101

The first BBU takes the first receiving and sending channel and a second receiving and sending channel as correction channels of the first RRU and a second RRU, and corrects a channel response ratio of the second receiving and sending channel, so that the channel response ratio of the second receiving and sending channel is consistent with the channel response ratio of the first receiving and sending channel — 102

(56) References Cited

U.S. PATENT DOCUMENTS

| | | | |
|---|---|---|---|
| 2011/0032839 A1* | 2/2011 | Chen | H04B 7/024 370/252 |
| 2011/0034175 A1* | 2/2011 | Fong | H04B 7/024 455/450 |
| 2011/0263280 A1 | 10/2011 | Guey | |
| 2012/0252366 A1 | 10/2012 | Aoki et al. | |
| 2012/0302281 A1 | 11/2012 | Takano | |
| 2012/0315891 A1 | 12/2012 | Takano | |
| 2013/0022097 A1* | 1/2013 | Hewavithana | H04L 25/022 375/232 |
| 2015/0085690 A1* | 3/2015 | Yi | H04L 25/0224 370/252 |
| 2015/0200740 A1* | 7/2015 | Yi | H04J 11/0053 370/329 |
| 2016/0099762 A1* | 4/2016 | Wu | H04L 25/0398 370/329 |

FOREIGN PATENT DOCUMENTS

| | | |
|---|---|---|
| CN | 101621824 A | 1/2010 |
| CN | 102326337 A | 1/2012 |
| CN | 102594430 A | 7/2012 |
| CN | 102624470 A | 8/2012 |
| CN | 103036633 A | 4/2013 |
| JP | 2011-217045 A | 10/2011 |
| JP | 2011-217046 A | 10/2011 |
| WO | WO 2011/074031 A1 | 6/2011 |
| WO | WO 2012/014066 A2 | 2/2012 |

OTHER PUBLICATIONS

"Antenna Calibration for CoMP Reconfiguration Scenario", Sony Corporation, 3GPP TSG RAN WG1 #65, May 9-13, 2011, 6 pages, R1-111335.

"Part 16: Air Interface for Broadband Wireless Access Systems", IEEE Standards Draft, P802.16Rev2/D7, Oct. 2008, 2080 pages.

* cited by examiner

101 — A first BBU takes a first receiving and sending channel as a reference correction channel in a first RRU, and corrects a channel response ratio of each receiving and sending channel in the first RRU, so that the channel response ratio of each receiving and sending channel in the first RRU is consistent with a channel response ratio of the first receiving and sending channel 102 — The first BBU takes the first receiving and sending channel and a second receiving and sending channel as correction channels of the first RRU and a second RRU, and corrects a channel response ratio of the second receiving and sending channel, so that the channel response ratio of the second receiving and sending channel is consistent with the channel response ratio of the first receiving and sending channel

FIG. 1

201 — A first BBU takes a first receiving and sending channel as a reference correction channel in a first RRU, and corrects a channel response ratio of each receiving and sending channel in the first RRU, so that the channel response ratio of each receiving and sending channel in the first RRU is consistent with a channel response ratio of the first receiving and sending channel 202 — The first BBU controls a correction reference signal to be transmitted between the first receiving and sending channel and a second receiving and sending channel 203 — Obtain a compensation parameter of the channel response ratio of the second receiving and sending channel with respect to the channel response ratio of the first receiving and sending channel according to a transmission result of the correction reference signal 204 — Compensate a channel response of the second receiving and sending channel by using the compensation parameter, so that the channel response ratio of the second receiving and sending channel is consistent with the channel response ratio of the first receiving and sending channel

METHOD, APPARATUS, AND SYSTEM FOR CORRECTING RECEIVING AND SENDING CHANNEL RESPONSE, AND BBU

CROSS-REFERENCE TO RELATED APPLICATIONS

This application is a continuation of International Application No. PCT/CN2012/087409, filed on Dec. 25, 2012, which claims priority to Chinese Patent Application No. 201210345419.1, filed on Sep. 17, 2012, both of which are hereby incorporated by reference in their entireties.

TECHNICAL FIELD

The present invention relates to the field of communications technologies, and in particular, to a method, an apparatus, and a system for correcting a receiving and sending channel response, and a baseband unit (Baseband Unit, BBU).

BACKGROUND

In long term evolution (Long Term Evolution, LTE), a coordinated multi-point transmission (Coordinated Multi-Point, CoMP) technology is introduced, so as to improve a data transmission rate. In a CoMP communication system applying the CoMP technology, a base station side may include a BBU, each BBU may connect to multiple radio remote units (Radio Remote Unit, RRU), and one RRU corresponds to one cell. When joint transmission (Joint Transmission, JT) performance is implemented through the CoMP communication system, the BBU may control multiple RRUs to send, through inter-cell coordination, downlink signals to a same user equipment (User Equipment, UE), so as to improve signal receiving quality of the UE. In the prior art, each RRU corresponds to an antenna array, the RRU has receiving and sending channels, the number of which is consistent with the number of antennas in the antenna array. For example, if an antenna array of a certain RRU includes 2 antennas, two receiving and sending channels are correspondingly set in the RRU. Each receiving and sending channel includes a sending channel and a receiving channel.

In the prior art, in order to ensure channel inequality of an RRU, it is required to correct a channel response of a receiving and sending channel in the RRU, so that a ratio of a channel response of a sending channel of each receiving and sending channel to a channel response of a receiving channel of the receiving and sending channel is the same. However, when downlink signals are transmitted to a UE through inter-RRU coordination, if only a channel response ratio of a receiving and sending channel in each RRU is corrected, a difference may still exist between channel response ratios of receiving and sending channels of different RRUs. Therefore, it is difficult to improve signal quality when signals are sent through inter-cell coordination, thereby reducing the JT performance of the CoMP communication system.

SUMMARY

Embodiments of the present invention provide a method, an apparatus, and a system for correcting a receiving and sending channel response, and a BBU, so as to solve a problem in the prior art that it is difficult to improve signal quality of signals sent through inter-cell coordination because a difference exists between channel response ratios of receiving and sending channels of different RRUs In order to solve the foregoing problem, the embodiments of the present invention provide the following technical solutions.

In one aspect, a method for correcting a receiving and sending channel response is provided, and is applied in a communication system including at least two coordinated radio frequency modules, where the at least two coordinated radio frequency modules include a first radio frequency module covering a first cell and a second radio frequency module covering a second cell, the first radio frequency module is connected to a first baseband module, the second radio frequency module is connected to a second baseband module, the first radio frequency module includes at least a first receiving and sending channel corresponding to a first antenna, the first receiving and sending channel includes a first sending channel and a first receiving channel, the second radio frequency module includes at least a second receiving and sending channel corresponding to a second antenna, and the second receiving and sending channel includes a second sending channel and a second receiving channel. The method includes:

taking, by the first baseband module, the first receiving and sending channel as a reference correction channel in the first radio frequency module, and correcting a channel response ratio of each receiving and sending channel in the first radio frequency module, so that the channel response ratio of each receiving and sending channel in the first radio frequency module is consistent with a channel response ratio of the first receiving and sending channel; and taking, by the first baseband module, the first receiving and sending channel and the second receiving and sending channel as correction channels of the first radio frequency module and the second radio frequency module, and correcting a channel response ratio of the second receiving and sending channel, so that the channel response ratio of the second receiving and sending channel is consistent with the channel response ratio of the first receiving and sending channel.

In combination with the one aspect, in a first possible implementation manner, when a base station in the communication system is a distributed base station, the first radio frequency module is a first radio remote unit RRU, the second radio frequency module is a second RRU, the first baseband module is a first baseband unit BBU, and the second baseband module is a second BBU; and when a base station in the communication system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

In combination with the one aspect or the first possible implementation manner, in a second possible implementation manner, the correcting the channel response ratio of the second receiving and sending channel, so that the channel response ratio of the second receiving and sending channel is consistent with the channel response ratio of the first receiving and sending channel includes:

controlling, by the first baseband module, a correction reference signal to be transmitted between the first receiving and sending channel and the second receiving and sending channel;

obtaining a compensation parameter of the channel response ratio of the second receiving and sending channel with respect to the channel response ratio of the first receiving and sending channel according to a transmission result of the correction reference signal; and compensating a channel response of the second receiving and sending channel by using the compensation parameter, so that the channel response ratio of the second receiving and sending channel is consistent with the channel response ratio of the first receiving and sending channel.

In combination with the second possible implementation manner, in a third possible implementation manner, the controlling, by the first baseband module, the correction reference signal to be transmitted between the first receiving and sending channel and the second receiving and sending channel includes:

controlling, by the first baseband module, the first sending channel to send a first correction sending reference signal in a first correction period, and receiving a first correction receiving reference signal returned by the second baseband module, where the first correction receiving reference signal is a reference signal transmitted to the second baseband module through the second receiving channel after the first radio frequency module sends the first correction sending reference signal to the second receiving channel through an air interface; and receiving, by the first baseband module, a second correction receiving reference signal transmitted by the first receiving channel in a second correction period, where the second correction receiving reference signal is a reference signal transmitted to the first baseband module through the first receiving channel after the second baseband module controls the second sending channel to send a second correction sending reference signal in the second correction period and the second radio frequency module sends the second correction sending reference signal to the first receiving channel through an air interface.

In combination with the third possible implementation manner, in a fourth possible implementation manner, the obtaining the compensation parameter of the channel response ratio of the second receiving and sending channel with respect to the channel response ratio of the first receiving and sending channel according to the transmission result of the correction reference signal includes:

calculating a first ratio of the first correction receiving reference signal to the first correction sending reference signal, and a second ratio of the second correction receiving reference signal to the second correction sending reference signal; and taking a result of dividing the first ratio by the second ratio as the compensation parameter of the channel response ratio of the second receiving and sending channel with respect to the channel response ratio of the first receiving and sending channel.

In combination with the third possible implementation manner or the fourth possible implementation manner, in a fifth possible implementation manner, the compensating the channel response of the second receiving and sending channel by using the compensation parameter includes:

multiplying a channel response of the second sending channel by the compensation parameter; or dividing a channel response of the second receiving channel by the compensation parameter.

In combination with the third possible implementation manner or the fourth possible implementation manner or the fifth possible implementation manner, in a sixth possible implementation manner, the method further includes:

when power of the first correction receiving reference signal is lower than a lowest power threshold, increasing, by the first baseband module, power of the first correction sending reference signal, so that the power of the first correction receiving reference signal is not lower than the lowest power threshold; and when the power of the first correction receiving reference signal is higher than a highest power threshold, reducing, by the first baseband module, the power of the first correction sending reference signal, so that the power of the first correction receiving reference signal is not higher than the highest power threshold.

In combination with the one aspect, the first possible implementation manner, the second possible implementation manner, the third possible implementation manner, the fourth possible implementation manner, the fifth possible implementation manner, or the sixth possible implementation manner, in a seventh possible implementation manner, before the correcting, by the first baseband module, the channel response ratio of the second receiving and sending channel, so that the channel response ratio of the second receiving and sending channel is consistent with the channel response ratio of the first receiving and sending channel, the method further includes:

controlling, by the first baseband module, a receiving and sending channel other than the first receiving and sending channel in the first radio frequency module to be closed.

In another aspect, an apparatus for correcting a receiving and sending channel response is provided, and is applied in a communication system including at least two coordinated radio frequency modules, where the at least two coordinated radio frequency modules include a first radio frequency module covering a first cell and a second radio frequency module covering a second cell, the first radio frequency module is connected to a first baseband module, the second radio frequency module is connected to a second baseband module, the first radio frequency module includes at least a first receiving and sending channel corresponding to a first antenna, the first receiving and sending channel includes a first sending channel and a first receiving channel, the second radio frequency module includes at least a second receiving and sending channel corresponding to a second antenna, and the second receiving and sending channel includes a second sending channel and a second receiving channel. The apparatus is disposed in the first baseband module, and includes:

an intra-cell correction unit, configured to take the first receiving and sending channel as a reference correction channel in the first radio frequency module, and correct a channel response ratio of each receiving and sending channel in the first radio frequency module, so that the channel response ratio of each receiving and sending channel in the first radio frequency module is consistent with a channel response ratio of the first receiving and sending channel; and an inter-cell correction unit, configured to: after the intra-cell correction unit completes correction, take the first receiving and sending channel and the second receiving and sending channel as correction channels of the first radio frequency module and the second radio frequency module, and correct a channel response ratio of the second receiving and sending channel, so that the channel response ratio of the second receiving and sending channel is consistent with the channel response ratio of the first receiving and sending channel.

In combination with the another aspect, in a first possible implementation manner, when a base station in the communication system is a distributed base station, the first radio frequency module is a first radio remote unit RRU, the second radio frequency module is a second RRU, the first baseband module is a first baseband unit BBU, and the second baseband module is a second BBU; and when a base station in the communication system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

In combination with the another aspect or the first possible implementation manner, in a second possible implementation manner, the inter-cell correction unit includes:

a transmission control sub-unit, configured to control a correction reference signal to be transmitted between the first receiving and sending channel and the second receiving and sending channel;

a parameter obtaining sub-unit, configured to obtain a compensation parameter of the channel response ratio of the second receiving and sending channel with respect to the channel response ratio of the first receiving and sending channel according to a transmission result of the correction reference signal; and a response compensating sub-unit, configured to compensate a channel response of the second receiving and sending channel by using the compensation parameter, so that the channel response ratio of the second receiving and sending channel is consistent with the channel response ratio of the first receiving and sending channel.

In combination with the second possible implementation manner, in a third possible implementation manner, the transmission control sub-unit is specifically configured to control the first sending channel to send a first correction sending reference signal in a first correction period, and receive a first correction receiving reference signal returned by the second baseband module, where the first correction receiving reference signal is a reference signal transmitted to the second baseband module through the second receiving channel after the first radio frequency module sends the first correction sending reference signal to the second receiving channel through an air interface; and receive a second correction receiving reference signal transmitted by the first receiving channel in a second correction period, where the second correction receiving reference signal is a reference signal transmitted to the first baseband module through the first receiving channel after the second baseband module controls the second sending channel to send a second correction sending reference signal in the second correction period and the second radio frequency module sends the second correction sending reference signal to the first receiving channel through an air interface.

In combination with the third possible implementation manner, in a fourth possible implementation manner, the parameter obtaining sub-unit is specifically configured to calculate a first ratio of the first correction receiving reference signal to the first correction sending reference signal, and a second ratio of the second correction receiving reference signal to the second correction sending reference signal, and take a result of dividing the first ratio by the second ratio as the compensation parameter of the channel response ratio of the second receiving and sending channel with respect to the channel response ratio of the first receiving and sending channel.

In combination with the third possible implementation manner or the fourth possible implementation manner, in a fifth possible implementation manner, the response compensating sub-unit is specifically configured to multiply a channel response of the second sending channel by the compensation parameter, or divide a channel response of the second receiving channel by the compensation parameter. In combination with the third possible implementation manner or the fourth possible implementation manner or the fifth possible implementation manner, in a sixth possible implementation manner, the inter-cell correction unit further includes:

a power adjusting sub-unit, configured to: when power of the first correction receiving reference signal is lower than a lowest power threshold, increase power of the first correction sending reference signal, so that the power of the first correction receiving reference signal is not lower than the lowest power threshold; and when the power of the first correction receiving reference signal is higher than a highest power threshold, reduce the power of the first correction sending reference signal, so that the power of the first correction receiving reference signal is not higher than the highest power threshold.

In combination with the another aspect, the first possible implementation manner, the second possible implementation manner, the third possible implementation manner, the fourth possible implementation manner, the fifth possible implementation manner, or the sixth possible implementation manner, in a seventh possible implementation manner, the inter-cell correction unit further includes:

a channel closing sub-unit, configured to control a receiving and sending channel other than the first receiving and sending channel in the first radio frequency module to be closed.

In still another aspect, a system for correcting a receiving and sending channel response is provided, and includes at least two coordinated radio frequency modules and baseband modules, where the at least two coordinated radio frequency modules include a first radio frequency module covering a first cell and a second radio frequency module covering a second cell, the first radio frequency module is connected to a first baseband module, the second radio frequency module is connected to a second baseband module, the first radio frequency module includes at least a first receiving and sending channel corresponding to a first antenna, the first receiving and sending channel includes a first sending channel and a first receiving channel, the second radio frequency module includes at least a second receiving and sending channel corresponding to a second antenna, and the second receiving and sending channel includes a second sending channel and a second receiving channel, and the first baseband module is configured to take the first receiving and sending channel as a reference correction channel in the first radio frequency module, and correct a channel response ratio of each receiving and sending channel in the first radio frequency module, so that the channel response ratio of each receiving and sending channel in the first radio frequency module is consistent with a channel response ratio of the first receiving and sending channel, and take the first receiving and sending channel and the second receiving and sending channel as correction channels of the first radio frequency module and the second radio frequency module, and correct a channel response ratio of the second receiving and sending channel, so that the channel response ratio of the second receiving and sending channel is consistent with the channel response ratio of the first receiving and sending channel.

In combination with the still another aspect, in a first possible implementation manner, when a base station in the system is a distributed base station, the first radio frequency module is a first radio remote unit RRU, the second radio frequency module is a second RRU, the first baseband module is a first baseband unit BBU, and the second baseband module is a second BBU; and when a base station in the system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

In combination with the still another aspect or the first possible implementation manner, in a second possible implementation manner, the first baseband module is specifically configured to control a correction reference signal to be transmitted between the first receiving and sending channel and the second receiving and sending channel, obtain a compensation parameter of the channel response ratio of the second receiving and sending channel with respect to the channel response ratio of the first receiving and sending channel according to a transmission result of the correction reference signal, and compensate a channel response of the second receiving and sending channel by using the compensation parameter, so that the channel response ratio of the second receiving and sending channel is consistent with the channel response ratio of the first receiving and sending channel.

In combination with the still another aspect, the first possible implementation manner, or the second possible implementation manner, in a third possible implementation manner, an air interface coupling channel exists between the first cell of the first radio frequency module and the second cell of the second radio frequency module.

In combination with the still another aspect, the first possible implementation manner, the second possible implementation manner, or the third possible implementation manner, in a fourth possible implementation manner, the second baseband module and the first baseband module are integrated as one baseband module.

In yet another aspect, a baseband unit BBU is provided., and is applied in a communication system including at least two coordinated radio remote units RRUs, where the at least two coordinated RRUs include a first RRU covering a first cell and a second RRU covering a second cell, the BBU serves as a first BBU in the communication system, and is connected to the first RRU, the second RRU is connected to a second BBU, the first RRU includes at least a first receiving and sending channel corresponding to a first antenna, the first receiving and sending channel includes a first sending channel and a first receiving channel, the second RRU includes at least a second receiving and sending channel corresponding to a second antenna, and the second receiving and sending channel includes a second sending channel and a second receiving channel. The BBU includes: an input/output interface, a controller, and a digital signal processor, where the input/output interface is configured to transmit a signal;

the controller is configured to take the first receiving and sending channel as a reference correction channel in the first RRU, and control the digital signal processor to perform intra-cell correction on a receiving and sending channel response;

the digital signal processor is configured to correct, under the control of the controller, a channel response ratio of each receiving and sending channel in the first RRU, so that the channel response ratio of each receiving and sending channel in the first RRU is consistent with a channel response ratio of the first receiving and sending channel;

the controller is further configured to: after the digital signal processor completes the intra-cell correction on the receiving and sending channel response, take the first receiving and sending channel and the second receiving and sending channel as correction channels of the first RRU and the second RRU, and control the digital signal processor to perform inter-cell correction on a receiving and sending channel response; and the digital signal processor is further configured to correct, under the control of the controller, a channel response ratio of the second receiving and sending channel, so that the channel response ratio of the second receiving and sending channel is consistent with the channel response ratio of the first receiving and sending channel.

In combination with the yet another aspect, in a first possible implementation manner, the input/output interface is specifically configured to transmit a correction reference signal transmitted between the first receiving and sending channel and the second receiving and sending channel;

the controller is specifically configured to control the input/output interface to transmit the correction reference signal to the digital signal processor;

the digital signal processor is specifically configured to obtain, under the control of the controller, a compensation parameter of the channel response ratio of the second receiving and sending channel with respect to the channel response ratio of the first receiving and sending channel according to a transmission result of the correction reference signal; and the controller is specifically configured to compensate a channel response of the second receiving and sending channel by using the compensation parameter obtained by the digital signal processor, so that the channel response ratio of the second receiving and sending channel is consistent with the channel response ratio of the first receiving and sending channel.

In combination with the yet another aspect or the first possible implementation manner, in a second possible implementation manner, the controller is further configured to control a receiving and sending channel other than the first receiving and sending channel in the first RRU to be closed.

In the embodiments of the present invention, after intra-cell correction on a channel response of a receiving and sending channel is completed in each RRU, two receiving and sending channels of different RRUs are selected as reference correction channels, to perform correction so that channel response ratios of the receiving and sending channels of the different RRUs are consistent. Correction on channel responses of receiving and sending channels of coordinated RRUs is implemented by applying the embodiments of the present invention, so that when the coordinated RRUs transmit downlink signals to a UE, channel response ratios of the receiving and sending channels of the different RRUs are the same, so signal quality may be improved when signals are sent through inter-cell coordination, thereby improving JT performance of the system.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

FIG. 1 is a flow chart of an embodiment of a method for correcting a receiving and sending channel response according to the present invention;

FIG. 2 is a flow chart of another embodiment of a method for correcting a receiving and sending channel response according to the present invention;

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

An embodiment of the present invention may be applied in a communication system including at least two coordinated radio frequency modules, where the at least two coordinated radio frequency modules include a first radio frequency module covering a first cell and a second radio frequency module covering a second cell, the first radio frequency module is connected to a first baseband module, the second radio frequency module is connected to a second baseband module, the first radio frequency module includes at least a first receiving and sending channel corresponding to a first antenna, the first receiving and sending channel includes a first sending channel and a first receiving channel, the second radio frequency module includes at least a second receiving and sending channel corresponding to a second antenna, and the second receiving and sending channel includes a second sending channel and a second receiving channel.

In the embodiments of the present invention, a radio frequency module and a baseband module have different specific forms according to different types of base stations in the communication system. When the base station is a distributed base station, the radio frequency module may be specifically an RRU, and the baseband module may be specifically a BBU; and when the base station is an integrated base station, for example, a macro base station such as a Macro eNB, an eNB, or a base transceiver station (Base Transceiver Station, BTS), or a micro base station (also referred to as a small base station) such as a Pico or an HeNB (home base station), the radio frequency module may be specifically an intermediate radio frequency unit, and the baseband module may be specifically a mater control and baseband unit.

The embodiments of the present invention are described in detail in the following by taking a distributed base station including an RRU and a BBU as an example.

Referring to FIG. 1, FIG. 1 is a flow chart of an embodiment of a method for correcting a receiving and sending channel response according to the present invention.

Step 101: A first BBU takes a first receiving and sending channel as a reference correction channel in a first RRU, and corrects a channel response ratio of each receiving and sending channel in the first RRU, so that the channel response ratio of each receiving and sending channel in the first RRU is consistent with a channel response ratio of the first receiving and sending channel.

Optionally, the first receiving and sending channel may be a receiving and sending channel specially disposed in the first RRU and used for correcting a channel response ratio, and may also be a receiving and sending channel selected from multiple receiving and sending channels for transmitting signals, and the number of receiving and sending channels in the first RRU is consistent with the number of antennas of the first RRU, which is not limited in the embodiment. In this embodiment, correction on channel response ratios of receiving and sending channels in the first BBU is consistent with that in the prior art, which is not repeatedly described here.

Step 102: The first BBU takes the first receiving and sending channel and a second receiving and sending channel as correction channels of the first RRU and a second RRU, and corrects a channel response ratio of the second receiving and sending channel, so that the channel response ratio of the second receiving and sending channel is consistent with the channel response ratio of the first receiving and sending channel.

Optionally, the first BBU controls a correction reference signal to be transmitted between the first receiving and sending channel and the second receiving and sending channel, obtains a compensation parameter of the channel response ratio of the second receiving and sending channel with respect to the channel response ratio of the first receiving and sending channel according to a transmission result of the correction reference signal, and compensates a channel response of the second receiving and sending channel by using the compensation parameter, so that the channel response ratio of the second receiving and sending channel is consistent with the channel response ratio of the first receiving and sending channel.

It can be seen from the foregoing embodiment that, after intra-cell correction on a channel response of a receiving and sending channel is completed in each RRU, two receiving and sending channels of different RRUs are selected as reference correction channels, to perform correction so that channel response ratios of the receiving and sending channels of the different RRUs are consistent. Correction on channel responses of receiving and sending channels of coordinated RRUs is implemented by applying the embodiments of the present invention, so that when the coordinated RRUs transmit downlink signals to a UE, channel response ratios of the receiving and sending channels of the different RRUs are the same, so signal quality may be improved when signals are sent through inter-cell coordination, thereby improving JT performance of the system.

Referring to FIG. 2, FIG. 2 is a flow chart of another embodiment of a method for correcting a receiving and sending channel response according to the present invention. In this embodiment, an inter-cell correction process of a channel response of a receiving and sending channel is described in detail.

Step 201: A first BBU takes a first receiving and sending channel as a reference correction channel in a first RRU, and corrects a channel response ratio of each receiving and sending channel in the first RRU, so that the channel response ratio of each receiving and sending channel in the first RRU is consistent with a channel response ratio of the first receiving and sending channel.

Optionally, the first receiving and sending channel may be a receiving and sending channel specially disposed in the first RRU and used for correcting a channel response ratio, and may also be a receiving and sending channel selected from multiple receiving and sending channels for transmitting signals, and the number of receiving and sending channels in the first RRU is consistent with the number of antennas of the first RRU, which is not limited in the embodiment. In this embodiment, correction on channel response ratios of receiving and sending channels in the first BBU is consistent with that in the prior art, which is not repeatedly described here.

Step 202: The first BBU controls a correction reference signal to be transmitted between the first receiving and sending channel and a second receiving and sending channel.

Optionally, before inter-cell correction is performed, the first BBU may control a receiving and sending channel other than the first receiving and sending channel in the first RRU to be closed.

Optionally, the first BBU controls a first sending channel to send a first correction sending reference signal in a first correction period, and receives a first correction receiving reference signal returned by a second BBU, where the first correction receiving reference signal is a reference signal transmitted to the second. BBU through a second receiving channel after the first RRU sends the first correction sending reference signal to the second receiving channel through an air interface; and the first BBU receives a second correction receiving reference signal transmitted by a first receiving channel in a second correction period, where the second correction receiving reference signal is a reference signal transmitted to the first BBU through the first receiving channel after the second BBU controls a second sending channel to send a second correction sending reference signal in the second correction period and the second RRU sends the second correction sending reference signal to the first receiving channel through an air interface.

An air interface coupling channel exists between air interfaces of a first cell of the first RRU and a second cell of the second RRU, and a signal is transmitted between the first RRU and the second RRU through the air interface coupling channel. The correction periods may be set to guard periods (Guard Period, GP) of different frames. For example, the first correction period is a GP of a $K^{th}$ frame, and the second correction period is a GP of a $(K+1)^{th}$ frame, or may also be agreed between the RRUs, which is not limited in the embodiment of the present invention.

The correction reference signal may include: a Sounding signal sequence defined in LTE and generated by using a Zadoff-Chu sequence, or a Golay sequence defined in IEEE802.16e, or other signal sequences defined by cells and related to each other, which is not limited in the embodiment of the present invention. Preferably, when the reference signal is sent, a whole working bandwidth of a cell may be covered.

Furthermore, when power of the first correction receiving reference signal is lower than a lowest power threshold, the first BBU increases power of the first correction sending reference signal, so that the power of the first correction receiving reference signal is not lower than the lowest power threshold; and when the power of the first correction receiving reference signal is higher than a highest power threshold, the first BBU reduces the power of the first correction sending reference signal, so that the power of the first correction receiving reference signal is not higher than the highest power threshold.

In this embodiment, when the first RRU and the second RRU each include multiple receiving and sending channels, the first receiving and sending channel is taken as an inter-cell reference correction channel selected from the first RRU, the second receiving and sending channel is taken as an inter-cell reference correction channel selected from the second RRU, a difference between power of correction receiving reference signals received by the first receiving channel in the first receiving and sending channel and the second receiving channel in the second receiving and sending channel and the highest power threshold is within a preset power range, and the preset power range is set to be as small as possible, so that the power of the correction reference signals received by the selected first receiving channel and second receiving channel is as close as possible to the highest power threshold.

Step 203: Obtain a compensation parameter of the channel response ratio of the second receiving and sending channel with respect to the channel response ratio of the first receiving and sending channel according to a transmission result of the correction reference signal.

Optionally, a first ratio of the first correction receiving reference signal to the first correction sending reference signal and a second ratio of the second correction receiving reference signal to the second correction sending reference signal are calculated, and a result of dividing the first ratio by the second ratio is taken as the compensation parameter of the channel response ratio of the second receiving and sending channel with respect to the channel response ratio of the first receiving and sending channel.

Step 204: Compensate a channel response of the second receiving and sending channel by using the compensation parameter, so that the channel response ratio of the second receiving and sending channel is consistent with the channel response ratio of the first receiving and sending channel.

Optionally, a channel response of the second sending channel may be multiplied by the compensation parameter, or a channel response of the second receiving channel may be divided by the compensation parameter.

It can be seen from the foregoing embodiment that, after intra-cell correction on a channel response of a receiving and sending channel is completed in each RRU, two receiving and sending channels of different RRUs are selected as reference correction channels, to perform correction so that channel response ratios of the receiving and sending channels of the different RRUs are consistent. Correction on channel responses of receiving and sending channels of coordinated RRUs is implemented by applying the embodiments of the present invention, so that when the coordinated RRUs transmit downlink signals to a UE, channel response ratios of the receiving and sending channels of the different RRUs are the same, so signal quality may be improved when signals are sent through inter-cell coordination, thereby improving JT performance of the system.

Figure 3:
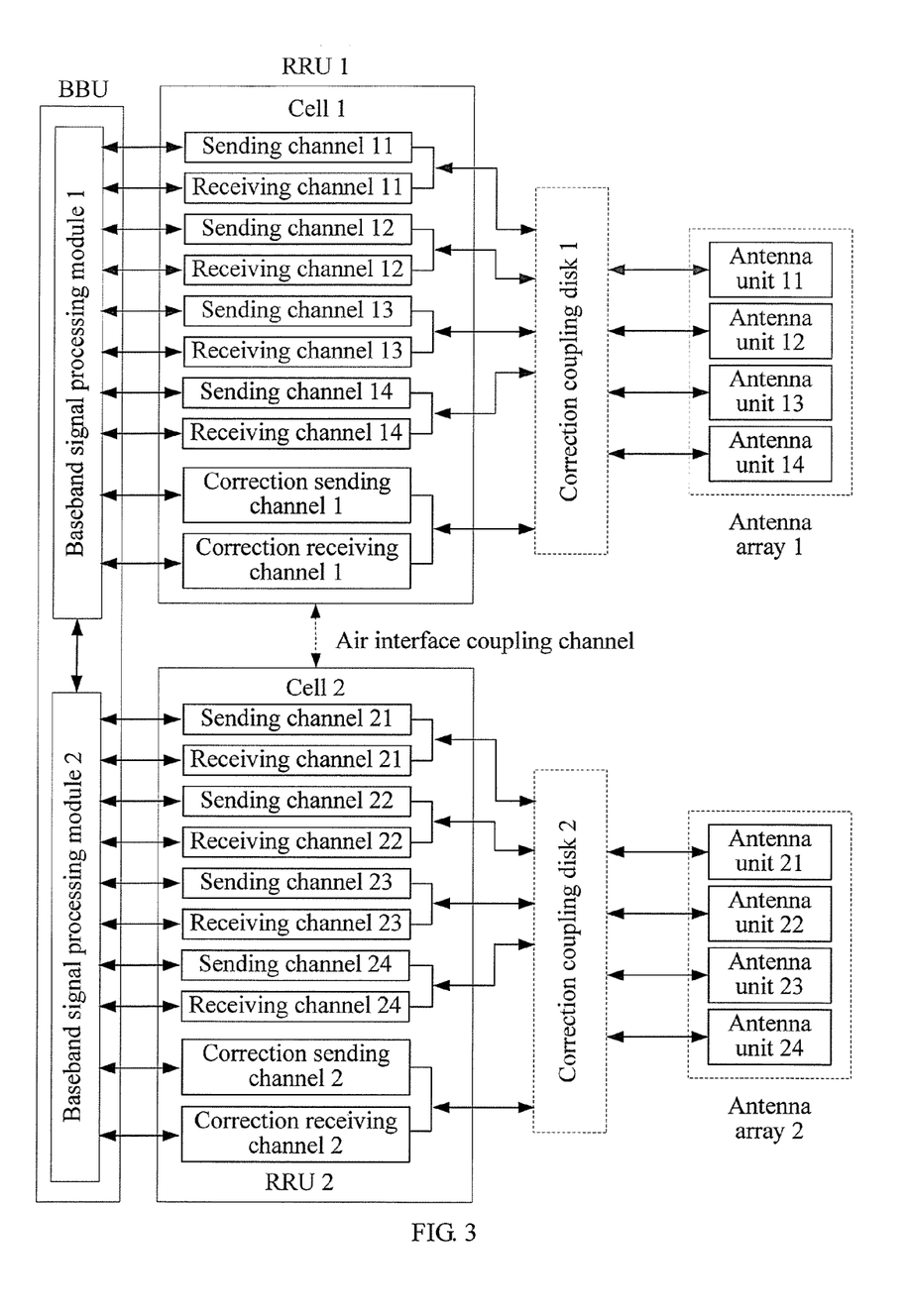
FIG. 3 is a schematic architecture diagram of a communication system applying a method embodiment of the present invention.

Referring to FIG. 3, FIG. 3 is a schematic architecture diagram of a communication system applying a method embodiment of the present invention.

For ease of description, FIG. 3 shows a BBU and two RRUs that are an RRU 1 and an RRU 2. A baseband signal processing module 1 corresponding to the RRU 1 and a baseband signal processing module 2 corresponding to the RRU 2 are disposed in the BBU. A cell 1 corresponding to the RRU 1 includes four receiving and sending channels, each receiving and sending channel corresponds to one antenna unit, the four receiving and sending channels in the cell 1 are connected to four antenna units through a correction coupling disk 1, and the four antenna units form an antenna array 1. A cell 2 corresponding to the RRU 2 includes four receiving and sending channels, each receiving and sending channel corresponds to one antenna unit, the four receiving and sending channels in the cell 2 are connected to four antenna units through a correction coupling disk 2, and the four antenna units form an antenna array 2. It should be noted that, the architecture shown in FIG. 3 is merely an example, while in an actual application, a correction coupling disk in each cell may not only be connected between the RRU and the antenna array through a cable, as shown in FIG. 3, but also be integrated with the RRU or integrated with the antenna array; moreover, FIG. 3 shows only four receiving and sending channels in each cell, while in an actual application, the different number of receiving and sending channels may also be disposed according to the number of antenna units in each antenna array; in addition, FIG. 3 shows only one BBU in the architecture, while in an actual application, a BBU may be correspondingly disposed for each RRU, and interaction between BBUs may be performed through an interface, which is not limited in the embodiment of the present invention. Intra-cell and inter-cell correction processes of channel responses of receiving and sending channels of the RRU 1 and the RRU 2 are described in the following with reference to FIG. 3.

First, an intra-cell correction process of a channel response of a receiving and sending channel performed in each of the RRU 1 and the RRU 2 is as follows.

Because correction processes of different receiving and sending channels in each cell are consistent, only correction on a channel response ratio of a receiving and sending channel in the cell 1 is taken as an example for description in the following with reference to FIG. 3. A correction process of a channel response ratio of a receiving and sending channel in the cell 2 is consistent with that in the cell 1, and is not repeatedly described here. The cell 1 includes a correction receiving and sending channel and four receiving and sending channels. The correction receiving and sending channel includes a correction sending channel 1 and a correction receiving channel 1. The four receiving and sending channels are a receiving and sending channel 11, a receiving and sending channel 12, a receiving and sending channel 13, and a receiving and sending channel 14. Each receiving and sending channel is formed of one sending channel and one receiving channel. It should be noted that, FIG. 3 shows that a correction receiving and sending channel independent of receiving and sending channels is disposed in each of the two cells to correct channel response ratios of the receiving and sending channels, while in an actual application, a certain receiving and sending channel in multiple receiving and sending channels may also be selected as a correction receiving and sending channel, which is not limited in the embodiment of the present invention. Because a correction process of a channel response ratio of each receiving and sending channel in the cell 1 with respect to the correction receiving and sending channel in the cell 1 is consistent, a correction process of the receiving and sending channel 11 in the cell 1 with respect to the correction receiving and sending channel 1 in the cell 1 is taken as an example for description in the following.

In a correction period of the cell 1, it is assumed that the baseband signal processing module 1 sends a signal $S_{1c}$, the signal $S_{1c}$ is transmitted through a sending channel 11, the correction coupling disk 1, and a correction receiving channel 1, and the baseband signal processing module 1 receives a signal $S_{1c'}$; the baseband signal processing module 1 of the cell 1 sends a signal $S_{c1}$, the signal $S_{c1}$ is transmitted through a correction sending channel 1, the correction coupling disk 1, and a receiving channel 11, and the baseband signal processing module 1 receives a signal $S_{c1'}$; and it is assumed that, a response channel of the sending channel 11 is $T_{11}$, a channel response of the receiving channel 11 is $R_{11}$, a channel response of the correction sending channel 1 is $T_c$, and a channel response of the correction receiving channel 1 is $R_c$. After the foregoing transmission processes, the baseband signal processing module 1 may obtain the following transmission results.

$$S_{1c} \times T_{11} \times R_c = S_{1c'}$$

$$S_{c1} \times T_c \times R_{11} = S_{c1'}$$

In the foregoing two formulas, $S_{1c}$ and $S_{c1}$ are signals transmitted by the baseband signal processing module 1, $S_{1c'}$ and $S_{c1'}$ are signals received by the baseband signal processing module 1, and both the transmitted signals and received signals are signals that may be obtained by the baseband signal processing module 1, that is, these signals are known signals. The following formula may be obtained by dividing the left side of the equal sign of the first formula by the left side of the equal sign of the second formula and dividing the right side of the equal sign of the first formula by the right side of the equal sign of the second formula.

$$\frac{\frac{T_{11}}{R_{11}}}{\frac{T_c}{R_c}} = \frac{S_{1c'} \times S_{c1}}{S_{c1'} \times S_{1c}}$$

A value of $$\frac{S_{1c'} \times S_{c1}}{S_{c1'} \times S_{1c}}$$

may be solved. Assume that $$\frac{S_{1c'} \times S_{c1}}{S_{c1'} \times S_{1c}} = k_c, \frac{T_{11}}{R_{11}} = \frac{T_c}{R_c} k_c.$$

It can be known from the foregoing formula that, a channel response ratio of the receiving and sending channel 11 may be adjusted, according to $k_c$ obtained through calculation, to be consistent with a channel response ratio of the correction receiving and sending channel 1.

Then, an inter-cell correction process of a channel response of a receiving and sending channel performed between the RRU 1 and the RRU 2 is as follows.

It is assumed that an antenna unit 11 of the cell 1 and an antenna unit 21 of the cell 2 are selected as a reference antenna pair for inter-cell correction on a receiving and sending channel response, that is, channel response ratio correction between the receiving and sending channel 11 and the receiving and sending channel 21 is implemented.

It is assumed that, in a first correction period, the baseband signal processing module 1 sends a signal $S_1$, the signal $S_1$ is transmitted through a sending channel 11, an air interface coupling channel between the cell 1 and the cell 2, and a receiving channel 21, and the baseband signal processing module 2 receives a signal $S_{1'}$; and it is assumed that, a channel response of the sending channel 11 is $T_{11}$ obtained after the intra-cell correction, a channel response of the receiving channel 21 is $R_{21}$, and a channel response of the air interface coupling channel between the cell 1 and the cell 2 is $H_{12}$. The baseband signal processing module 2 may obtain the following transmission result after the foregoing transmission process.

$$S_1 \times T_{11} \times H_{12} \times R_{21} = S_{1'}$$

Similarly, it is assumed that, in a second correction period, the baseband signal processing module 2 sends a signal $S_2$, the signal $S_2$ is transmitted through a sending channel 21, an air interface coupling channel between the cell 2 and the cell 1, and a receiving channel 11, and the baseband signal processing module 1 receives a signal $S_{2'}$; and it is assumed that, a transmission characteristic channel response of the sending channel 21 is $T_{21}$, a channel response of the air interface coupling channel between the cell 2 and the cell 1 is $H_{21}$, and a receiving characteristic channel response of the receiving channel 11 is $R_{11}$ obtained after the intra-cell correction. The baseband signal processing module 1 may obtain the following transmission result after the foregoing transmission process.

$$S_2 \times T_{21} \times H_{21} \times R_{11} = S_{2'}$$

The first correction period and the second correction period maybe GPs in two adjacent frames. For example, the first correction period is a GP zone of a $K^{th}$ frame, and the second correction period is a GP zone of a $(K+1)^{th}$ frame.

It can be known from FIG. 3 that, the baseband signal processing module 1 may communicate with the baseband signal processing module 2. Therefore, during channel response correction of receiving and sending channels of the cell 1 and the cell 2, any cell may be selected to calculate a correction coefficient. In this embodiment, it is assumed that the baseband signal processing module 1 performs calculation. The baseband signal processing module 2 may send the transmission result $S_1 \times T_{11} \times H_{12} \times R_{21} = S_{1'}$ to the baseband signal processing module 1, and the baseband signal processing module 1 obtains the following transmission results accordingly.

$$S_1 \times T_{11} \times H_{12} \times R_{21} = S_{1'}$$

$$S_2 \times T_{21} \times H_{21} \times R_{11} = S_{2'}$$

In the foregoing two formulas, the signals $S_1$, $S_2$, $S_{1'}$, and $S_{2'}$ are known signals, and $H_{12}$ is equal to $H_{21}$. Therefore, the following formula may be obtained by dividing the left side of the equal sign of the first formula by the left side of the equal sign of the second formula and dividing the right side of the equal sign of the first formula by the right side of the equal sign of the second formula.

$$\frac{\frac{T_{11}}{R_{11}}}{\frac{T_{21}}{R_{21}}} = \frac{S1'/S1}{S2'/S2}$$

A value of $$\frac{S1'/S1}{S2'/S2}$$

may be solved. Assume that $$\frac{S1'/S1}{S2'/S2} = \alpha 1, \frac{T_{11}}{R_{11}} = \alpha 1 \times \frac{T_{21}}{R_{21}}.$$

It can be known from the foregoing formula that, $\alpha 1$ is a compensation parameter. For the receiving and sending channel 21 of the cell 2, the channel response of the sending channel 21 may be multiplied by $\alpha 1$, or the channel response of the receiving channel 21 is divided by $\alpha 1$, so that the channel response ratio of the receiving and sending channel 11 is the same as a channel response ratio of the receiving and sending channel 21.

In addition, for a receiving and sending channel 22, a receiving and sending channel 23, and a receiving and sending channel 24 of the cell 2, the receiving and sending channel 11 of the cell 1 may be taken as a reference correction channel, to perform inter-cell correction on receiving and sending channel response with respect to the receiving and sending channel 11 separately. Specific processes are consistent with the foregoing correction process of the receiving and sending channel 21 with respect to the receiving and sending channel 11, and are not repeatedly described here.

Through the inter-cell correction, a channel response ratio of each receiving and sending channel in the cell 2 is finally consistent with the channel response ratio of the receiving and sending channel 11 in the cell 1. Because channel response ratios of the receiving and sending channels in the cell 1 are already corrected with respect to each other, after the inter-cell correction is completed, the channel response ratios of all the receiving and sending channels in the cell 1 are consistent with channel response ratios of all the receiving and sending channels in the cell 2. When downlink signals are sent through inter-cell coordination after the correction, signal sending quality and JT performance of the communication system may be improved.

Corresponding to the embodiments of the method for correcting a receiving and sending channel response according to the present invention, the present invention further provides embodiments of an apparatus and a system for correcting a receiving and sending channel response, and a BBU.

Figure 4:
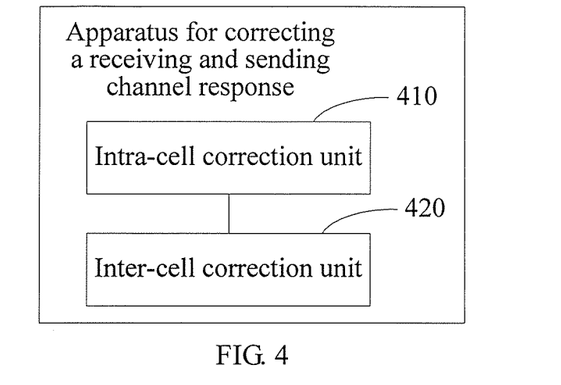
FIG. 4 is a block diagram of an embodiment of an apparatus for correcting a receiving and sending channel response according to the present invention.

Referring to FIG. 4, FIG. 4 is a block diagram of an embodiment of an apparatus for correcting a receiving and sending channel response according to the present invention.

The apparatus is applied in a communication system including at least two coordinated radio remote units RRUs, where the at least two coordinated RRUs include a first RRU covering a first cell and a second RRU covering a second cell, the first RRU is connected to a first baseband unit BBU, the second RRU is connected to a second BBU, the first RRU includes at least a first receiving and sending channel corresponding to a first antenna, the first receiving and sending channel includes a first sending channel and a first receiving channel, the second RRU includes at least a second receiving and sending channel corresponding to a second antenna, and the second receiving and sending channel includes a second sending channel and a second receiving channel.

The apparatus may be disposed in the first BBU, and may include an intra-cell correction unit 410 and an inter-cell correction unit 420.

The intra-cell correction unit 410 is configured to take the first receiving and sending channel as a reference correction channel in the first RRU, and correct a channel response ratio of each receiving and sending channel in the first RRU, so that the channel response ratio of each receiving and sending channel in the first RRU is consistent with a channel response ratio of the first receiving and sending channel.

The inter-cell correction unit 420 is configured to: after the intra-cell correction unit completes correction, take the first receiving and sending channel and the second receiving and sending channel as correction channels of the first RRU and the second RRU, and correct a channel response ratio of the second receiving and sending channel, so that the channel response ratio of the second receiving and sending channel is consistent with the channel response ratio of the first receiving and sending channel.

Figure 5:
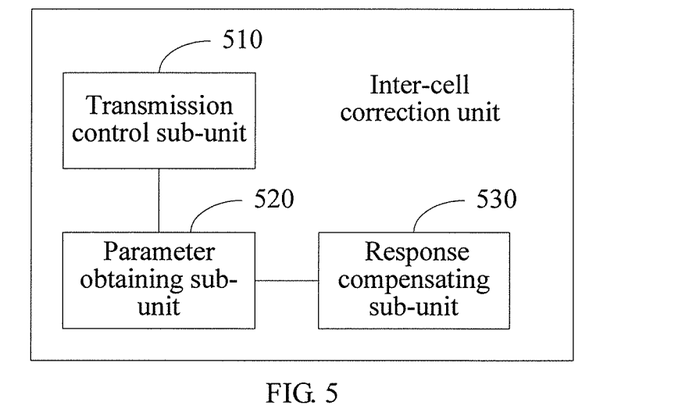
FIG. 5 is a block diagram of an embodiment of an inter-cell correction unit in FIG. 4.

Referring to FIG. 5, FIG. 5 is a block diagram of an embodiment of an inter-cell correction unit in FIG. 4.

The inter-cell correction unit includes: a transmission control sub-unit 510, a parameter obtaining sub-unit 520, and a response compensating sub-unit 530.

The transmission control sub-unit 510 is configured to control a correction reference signal to be transmitted between the first receiving and sending channel and the second receiving and sending channel.

The parameter obtaining sub-unit 520 is configured to obtain a compensation parameter of the channel response ratio of the second receiving and sending channel with respect to the channel response ratio of the first receiving and sending channel according to a transmission result of the correction reference signal.

The response compensating sub-unit 530 is configured to compensate a channel response of the second receiving and sending channel by using the compensation parameter, so that the channel response ratio of the second receiving and sending channel is consistent with the channel response ratio of the first receiving and sending channel.

Optionally, the transmission control sub-unit 510 may be specifically configured to control the first sending channel to send a first correction sending reference signal in a first correction period, and receive a first correction receiving reference signal returned by the second BBU, where the first correction receiving reference signal is a reference signal transmitted to the second BBU through the second receiving channel after the first RRU sends the first correction sending reference signal to the second receiving channel through an air interface; and receive a second correction receiving reference signal transmitted by the first receiving channel in a second correction period, where the second correction receiving reference signal is a reference signal transmitted to the first BBU through the first receiving channel after the second BBU controls the second sending channel to send a second correction sending reference signal in the second correction period and the second RRU sends the second correction sending reference signal to the first receiving channel through an air interface.

Optionally, the parameter obtaining sub-unit 520 may be specifically configured to calculate a first ratio of the first correction receiving reference signal to the first correction sending reference signal, and a second ratio of the second correction receiving reference signal to the second correction sending reference signal, and take a result of dividing the first ratio by the second ratio as the compensation parameter of the channel response ratio of the second receiving and sending channel with respect to the channel response ratio of the first receiving and sending channel.

Optionally, the response compensating sub-unit 530 may be specifically configured to: multiply a channel response of the second sending channel by the compensation parameter, or divide a channel response of the second receiving channel by the compensation parameter.

Figure 6:
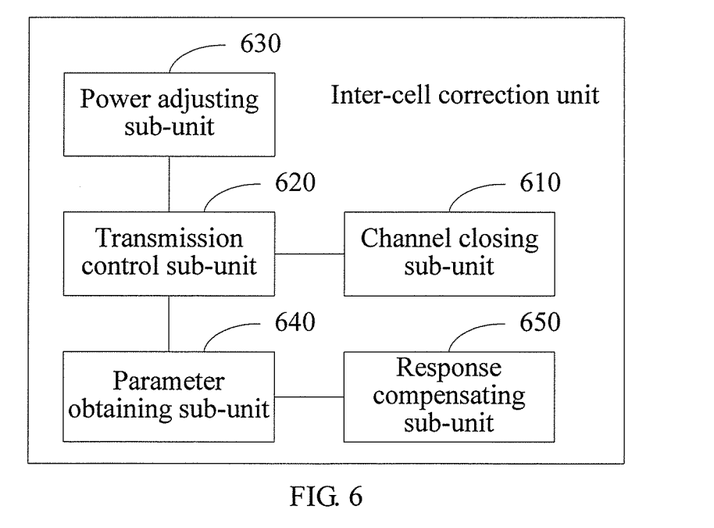
FIG. 6 is a block diagram of another embodiment of an inter-cell correction unit in FIG. 4.

Referring to FIG. 6, FIG. 6 is a block diagram of another embodiment of an inter-cell correction unit in FIG. 4.

The inter-cell correction unit includes: a channel closing sub-unit 610, a transmission control sub-unit 620, a power adjusting sub-unit 630, a parameter obtaining sub-unit 640, and a response compensating sub-unit 650.

The channel closing sub-unit 610 is configured to control a receiving and sending channel other than the first receiving and sending channel in the first RRU to be closed.

The transmission control sub-unit 620 is configured to control the first sending channel to send a first correction sending reference signal in a first correction period, and receive a first correction receiving reference signal returned by the second BBU, where the first correction receiving reference signal is a reference signal transmitted to the second BBU through the second receiving channel after the first RRU sends the first correction sending reference signal to the second receiving channel through an air interface; and receive a second correction receiving reference signal transmitted by the first receiving channel in a second correction period, where the second correction receiving reference signal is a reference signal transmitted to the first BBU through the first receiving channel after the second BBU controls the second sending channel to send a second correction sending reference signal in the second correction period and the second RRU sends the second correction sending reference signal to the first receiving channel through an air interface.

The power adjusting sub-unit 630 is configured to: when power of the first correction receiving reference signal is lower than a lowest power threshold, increase power of the first correction sending reference signal, so that the power of the first correction receiving reference signal is not lower than the lowest power threshold; and when the power of the first correction receiving reference signal is higher than a highest power threshold, reduce the power of the first correction sending reference signal, so that the power of the first correction receiving reference signal is not higher than the highest power threshold.

The parameter obtaining sub-unit 640 is configured to calculate a first ratio of the first correction receiving reference signal to the first correction sending reference signal, and a second ratio of the second correction receiving reference signal to the second correction sending reference signal, and take a result of dividing the first ratio by the second ratio as the compensation parameter of the channel response ratio of the second receiving and sending channel with respect to the channel response ratio of the first receiving and sending channel.

The response compensating sub-unit 650 is configured to multiply a channel response of the second sending channel by the compensation parameter, or divide a channel response of the second receiving channel by the compensation parameter, so that the channel response ratio of the second receiving and sending channel is consistent with the channel response ratio of the first receiving and sending channel.

Figure 7:
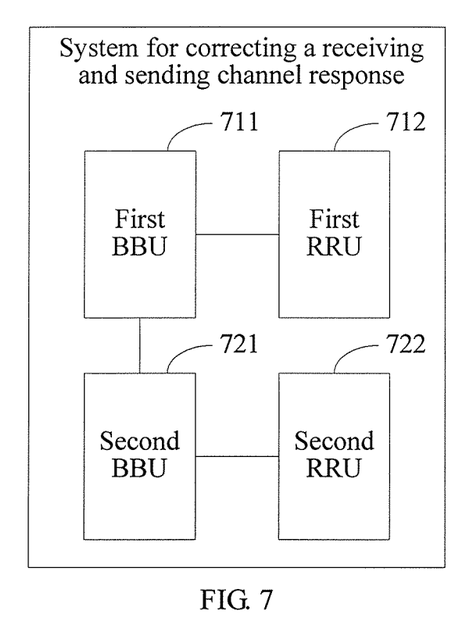
FIG. 7 is a block diagram of an embodiment of a system for correcting a receiving and sending channel response according to the present invention.

Referring to FIG. 7, FIG. 7 is a block diagram of an embodiment of a system for correcting a receiving and sending channel response according to the present invention.

The system includes: at least two coordinated RRUs and BBUs. For ease of exemplification and description, FIG. 7 shows a first BBU 711, a first RRU 712 connected to the first BBU 711, a second BBU 721, and a second RRU 722 connected to the second BBU 721. The first RRU 712 covers a first cell, and the second RRU 722 covers a second cell. The first RRU 712 includes at least a first receiving and sending channel corresponding to a first antenna, the first receiving and sending channel includes a first sending channel and a first receiving channel, the second RRU 722 includes at least a second receiving and sending channel corresponding to a second antenna, and the second receiving and sending channel includes a second sending channel and a second receiving channel. The first receiving and sending channel, the first antenna, the second receiving and sending channel, and the second antenna are not shown in FIG. 7.

The first BBU 711 is configured to take the first receiving and sending channel as a reference correction channel in the first RRU 712, and correct a channel response ratio of each receiving and sending channel in the first RRU 712, so that the channel response ratio of each receiving and sending channel in the first RRU 712 is consistent with a channel response ratio of the first receiving and sending channel, and take the first receiving and sending channel and the second receiving and sending channel as correction channels of the first RRU 712 and the second RRU 722, and correct a channel response ratio of the second receiving and sending channel, so that the channel response ratio of the second receiving and sending channel is consistent with the channel response ratio of the first receiving and sending channel.

Optionally, the first BBU 711 is specifically configured to control a correction reference signal to be transmitted between the first receiving and sending channel and the second receiving and sending channel, obtain a compensation parameter of the channel response ratio of the second receiving and sending channel with respect to the channel response ratio of the first receiving and sending channel according to a transmission result of the correction reference signal, and compensate a channel response of the second receiving and sending channel by using the compensation parameter, so that the channel response ratio of the second receiving and sending channel is consistent with the channel response ratio of the first receiving and sending channel.

In the foregoing embodiment, an air interface coupling channel may exist between the first cell of the first RRU 712 and the second cell of the second RRU 722, and a signal is transmitted between the first RRU 712 and the second RRU 722 through the air interface coupling channel.

It should be noted that, the second BBU 722 and the first BBU 712 shown in FIG. 7 are disposed separately, while in an actual application, the second BBU 722 and the first BBU 712 may also be integrated in one BBU, which is not limited in the embodiment of the present invention.

In the foregoing embodiment, for related description of the first BBU, reference may be made to the foregoing method and apparatus embodiments, and details are not repeatedly described here. The system may also be specifically applied in the communication system architecture shown in FIG. 3.

Figure 8:
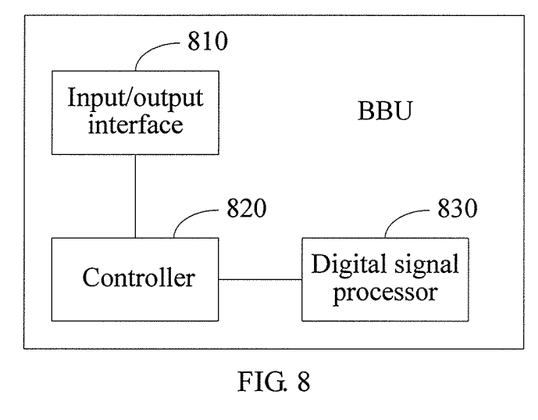
FIG. 8 is a block diagram of an embodiment of a BBU according to the present invention.

Referring to FIG. 8, FIG. 8 is a block diagram of an embodiment of a BBU according to the present invention.

The BBU shown in FIG. 8 is applied in a communication system including at least two coordinated radio remote units RRUs, where the at least two coordinated RRUs include a first RRU covering a first cell and a second RRU covering a second cell, the BBU serves as a first BBU in the communication system, and is connected to the first RRU, the second RRU is connected to a second BBU, the first RRU includes at least a first receiving and sending channel corresponding to a first antenna, the first receiving and sending channel includes a first sending channel and a first receiving channel, the second RRU includes at least a second receiving and sending channel corresponding to a second antenna, and the second receiving and sending channel includes a second sending channel and a second receiving channel.

The BBU may include: an input/output interface 810, a controller 820, and a digital signal processor (Digital Signal Processor, DSP) 830.

The input/output interface 810 is configured to transmit a signal.

The controller 820 is configured to take the first receiving and sending channel as a reference correction channel in the first RRU, and control the digital signal processor to perform intra-cell correction on a receiving and sending channel response.

The digital signal processor 830 is configured to correct, under the control of the controller, a channel response ratio of each receiving and sending channel in the first RRU, so that the channel response ratio of each receiving and sending channel in the first RRU is consistent with a channel response ratio of the first receiving and sending channel.

The controller 820 is further configured to: after the digital signal processor completes the intra-cell correction on the receiving and sending channel response, take the first receiving and sending channel and the second receiving and sending channel as correction channels of the first RRU and the second RRU, and control the digital signal processor to perform inter-cell correction on a receiving and sending channel response.

The digital signal processor 830 is further configured to correct, under the control of the controller, a channel response ratio of the second receiving and sending channel, so that the channel response ratio of the second receiving and sending channel is consistent with the channel response ratio of the first receiving and sending channel.

Optionally, the input/output interface 810 is specifically configured to transmit a correction reference signal transmitted between the first receiving and sending channel and the second receiving and sending channel.

The controller 820 is specifically configured to control the input/output interface to transmit the correction reference signal to the digital signal processor.

The digital signal processor 830 is specifically configured to obtain, under the control of the controller, a compensation parameter of the channel response ratio of the second receiving and sending channel with respect to the channel response ratio of the first receiving and sending channel according to a transmission result of the correction reference signal.

The controller 820 is specifically configured to compensate a channel response of the second receiving and sending channel by using the compensation parameter obtained by the digital signal processor, so that the channel response ratio of the second receiving and sending channel is consistent with the channel response ratio of the first receiving and sending channel.

Optionally, the controller 820 may be further configured to control a receiving and sending channel other than the first receiving and sending channel in the first RRU to be closed.

It can be seen from the foregoing embodiment that, after intra-cell correction on a channel response of a receiving and sending channel is completed in each RRU, two receiving and sending channels of different RRUs are selected as reference correction channels, to perform correction so that channel response ratios of the receiving and sending channels of the different RRUs are consistent. Correction on channel responses of receiving and sending channels of coordinated RRUs is implemented by applying the embodiments of the present invention, so that when the coordinated RRUs transmit downlink signals to a UE, channel response ratios of the receiving and sending channels of the different RRUs are the same, so signal quality may be improved when signals are sent through inter-cell coordination, thereby improving JT performance of the system.

Persons skilled in the art may clearly understand that, the technique in the embodiments of the present invention may be implemented through software plus a necessary general hardware platform. Based on such understanding, the technical solutions in the embodiments of the present invention essentially, or the part contributing to the prior art may be embodied in the form of a software product. The computer software product may be stored in a storage medium, such as an ROM/RAM, a magnetic disk, or an optical disk, and includes several instructions for enabling a computer device (which may be a personal computer, a server, or a network device, or the like) to perform the methods described in the embodiments of the present invention or in some parts of the embodiments of the present invention.

The embodiments in this specification are all described in a progressive manner, mutual reference may be made for a same or similar part of the embodiments, and each embodiment focuses on describing a difference from other embodiments. In particular, because the system embodiment basically similar to the method embodiment, the system embodiment is described simply. For the related part, reference may be made to apart of the description of the method embodiment.

The foregoing description is implementation manners of the present invention, but is not intended to limit the protection scope of the present invention. Any modification, equivalent replacement and improvement made within the spirit and principle of the present invention shall fall within the protection scope of the present invention.

What is claimed is:

1. A method for correcting a receiving and sending channel response, applied in a communication system comprising at least two coordinated radio frequency modules, wherein the at least two coordinated radio frequency modules comprise a first radio frequency module covering a first cell and a second radio frequency module covering a second cell, the first radio frequency module is connected to a first baseband module, the second radio frequency module is connected to a second baseband module, the first radio frequency module comprises at least a first receiving and sending channel corresponding to a first antenna, the first receiving and sending channel comprises a first sending channel and a first receiving channel, the second radio frequency module comprises at least a second receiving and sending channel corresponding to a second antenna, and the second receiving and sending channel comprises a second sending channel and a second receiving channel, and the method comprises:

taking, by the first radio frequency module, the first receiving and sending channel as a reference correction channel in the first radio frequency module, correcting a channel response ratio of each receiving and sending channel in the first radio frequency module, so that the channel response ratio of each receiving and sending channel in the first radio frequency module is consistent with a channel response ratio of the first receiving and sending channel; and taking, by the first radio frequency module, the first receiving and sending channel and the second receiving and sending channel as correction channels of the first radio frequency module and the second radio frequency module, correcting a channel response ratio of the second receiving and sending channel, so that the channel response ratio of the second receiving and sending channel is consistent with the channel response ratio of the first receiving and sending channel.

2. The method according to claim 1, wherein:

when a base station in the communication system is a distributed base station, the first radio frequency module is a first radio remote unit (RRU), the second radio frequency module is a second RRU, the first baseband module is a first baseband unit (BBU), and the second baseband module is a second BBU; and when a base station in the communication system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

3. The method according to claim 1, wherein correcting the channel response ratio of the second receiving and sending channel, so that the channel response ratio of the second receiving and sending channel is consistent with the channel response ratio of the first receiving and sending channel comprises:

controlling, by the first baseband module, a correction reference signal to be transmitted between the first receiving and sending channel and the second receiving and sending channel;

obtaining a compensation parameter of the channel response ratio of the second receiving and sending channel with respect to the channel response ratio of the first receiving and sending channel according to a transmission result of the correction reference signal; and compensating a channel response of the second receiving and sending channel by using the compensation parameter, so that the channel response ratio of the second receiving and sending channel is consistent with the channel response ratio of the first receiving and sending channel.

4. The method according to claim 3, wherein controlling, by the first baseband module, the correction reference signal to be transmitted between the first receiving and sending channel and the second receiving and sending channel comprises:

controlling, by the first baseband module, the first sending channel to send a first correction sending reference signal in a first correction period, and receiving a first correction receiving reference signal returned by the second baseband module, wherein the first correction receiving reference signal is a reference signal transmitted to the second baseband module through the second receiving channel after the first radio frequency module sends the first correction sending reference signal to the second receiving channel through an air interface; and receiving, by the first baseband module, a second correction receiving reference signal transmitted by the first receiving channel in a second correction period, wherein the second correction receiving reference signal is a reference signal transmitted to the first baseband module through the first receiving channel after the second baseband module controls the second sending channel to send a second correction sending reference signal in the second correction period and the second radio frequency module sends the second correction sending reference signal to the first receiving channel through an air interface.

5. The method according to claim 4, wherein obtaining the compensation parameter of the channel response ratio of the second receiving and sending channel with respect to the channel response ratio of the first receiving and sending channel according to the transmission result of the correction reference signal comprises:

calculating a first ratio of the first correction receiving reference signal to the first correction sending reference signal, and a second ratio of the second correction receiving reference signal to the second correction sending reference signal; and taking a result of dividing the first ratio by the second ratio as the compensation parameter of the channel response ratio of the second receiving and sending channel with respect to the channel response ratio of the first receiving and sending channel.

6. The method according to claim 4, wherein compensating the channel response of the second receiving and sending channel by using the compensation parameter comprises:

multiplying a channel response of the second sending channel by the compensation parameter; or dividing a channel response of the second receiving channel by the compensation parameter.

7. The method according to claim 4, wherein the method further comprises:

when power of the first correction receiving reference signal is lower than a lowest power threshold, increasing, by the first baseband module, power of the first correction sending reference signal, so that the power of the first correction receiving reference signal is not lower than the lowest power threshold; and when the power of the first correction receiving reference signal is higher than a highest power threshold, reducing, by the first baseband module, the power of the first correction sending reference signal, so that the power of the first correction receiving reference signal is not higher than the highest power threshold.

8. An apparatus for correcting a receiving and sending channel response, applied in a communication system comprising at least two coordinated radio frequency modules, wherein the at least two coordinated radio frequency modules comprise a first radio frequency module covering a first cell and a second radio frequency module covering a second cell, the first radio frequency module is connected to a first baseband module, the second radio frequency module is connected to a second baseband module, the first radio frequency module comprises at least a first receiving and sending channel corresponding to a first antenna, the first receiving and sending channel comprises a first sending channel and a first receiving channel, the second radio frequency module comprises at least a second receiving and sending channel corresponding to a second antenna, the second receiving and sending channel comprises a second sending channel and a second receiving channel, and the apparatus is disposed in the first baseband module, and the apparatus comprises:

an intra-cell correction unit, configured to take the first receiving and sending channel as a reference correction channel in the first radio frequency module, and correct a channel response ratio of each receiving and sending channel in the first radio frequency module, so that the channel response ratio of each receiving and sending channel in the first radio frequency module is consistent with a channel response ratio of the first receiving and sending channel; and an inter-cell correction unit, configured to: after the intra-cell correction unit completes correction, take the first receiving and sending channel and the second receiving and sending channel as correction channels of the first radio frequency module and the second radio frequency module, and correct a channel response ratio of the second receiving and sending channel, so that the channel response ratio of the second receiving and sending channel is consistent with the channel response ratio of the first receiving and sending channel.

9. The apparatus according to claim 8, wherein:

when a base station in the communication system is a distributed base station, the first radio frequency module is a first radio remote unit (RRU), the second radio frequency module is a second RRU, the first baseband module is a first baseband unit (BBU), and the second baseband module is a second BBU; and when a base station in the communication system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

10. The apparatus according to claim 9, wherein the inter-cell correction unit further comprises a channel closing sub-unit configured to control a receiving and sending channel other than the first receiving and sending channel in the first radio frequency module to be closed.

11. The apparatus according to claim 8, wherein the inter-cell correction unit comprises:

a transmission control sub-unit, configured to control a correction reference signal to be transmitted between the first receiving and sending channel and the second receiving and sending channel;

a parameter obtaining sub-unit, configured to obtain a compensation parameter of the channel response ratio of the second receiving and sending channel with respect to the channel response ratio of the first receiving and sending channel according to a transmission result of the correction reference signal; and a response compensating sub-unit, configured to compensate a channel response of the second receiving and sending channel by using the compensation parameter, so that the channel response ratio of the second receiving and sending channel is consistent with the channel response ratio of the first receiving and sending channel.

12. The apparatus according to claim 11, wherein the transmission control sub-unit is configured to:
control the first sending channel to send a first correction sending reference signal in a first correction period;
receive a first correction receiving reference signal returned by the second baseband module, wherein the first correction receiving reference signal is a reference signal transmitted to the second baseband module through the second receiving channel after the first radio frequency module sends the first correction sending reference signal to the second receiving channel through an air interface; and
receive a second correction receiving reference signal transmitted by the first receiving channel in a second correction period, wherein the second correction receiving reference signal is a reference signal transmitted to the first baseband module through the first receiving channel after the second baseband module controls the second sending channel to send a second correction sending reference signal in the second correction period and the second radio frequency module sends the second correction sending reference signal to the first receiving channel through an air interface.

13. The apparatus according to claim 12, wherein the parameter obtaining sub-unit is configured to calculate a first ratio of the first correction receiving reference signal to the first correction sending reference signal, and a second ratio of the second correction receiving reference signal to the second correction sending reference signal, and take a result of dividing the first ratio by the second ratio as the compensation parameter of the channel response ratio of the second receiving and sending channel with respect to the channel response ratio of the first receiving and sending channel.

14. The apparatus according to claim 12, wherein the response compensating sub-unit is configured to:
multiply a channel response of the second sending channel by the compensation parameter; or
divide a channel response of the second receiving channel by the compensation parameter.

15. The apparatus according to claim 12, wherein the inter-cell correction unit further comprises a power adjusting sub-unit configured to:
when power of the first correction receiving reference signal is lower than a lowest power threshold, increase power of the first correction sending reference signal, so that the power of the first correction receiving reference signal is not lower than the lowest power threshold; and
when the power of the first correction receiving reference signal is higher than a highest power threshold, reduce the power of the first correction sending reference signal, so that the power of the first correction receiving reference signal is not higher than the highest power threshold.

16. A system for correcting a receiving and sending channel response, the system comprises:
at least two coordinated radio frequency modules and baseband modules, the at least two coordinated radio frequency modules comprise a first radio frequency module covering a first cell and a second radio frequency module covering a second cell, the first radio frequency module is connected to a first baseband module, the second radio frequency module is connected to a second baseband module, the first radio frequency module comprises at least a first receiving and sending channel corresponding to a first antenna, the first receiving and sending channel comprises a first sending channel and a first receiving channel, the second radio frequency module comprises at least a second receiving and sending channel corresponding to a second antenna, and the second receiving and sending channel comprises a second sending channel and a second receiving channel, and
wherein the first baseband module is configured to:
take the first receiving and sending channel as a reference correction channel in the first radio frequency module, correct a channel response ratio of each receiving and sending channel in the first radio frequency module, so that the channel response ratio of each receiving and sending channel in the first radio frequency module is consistent with a channel response ratio of the first receiving and sending channel, and
take the first receiving and sending channel and the second receiving and sending channel as correction channels of the first radio frequency module and the second radio frequency module, correct a channel response ratio of the second receiving and sending channel, so that the channel response ratio of the second receiving and sending channel is consistent with the channel response ratio of the first receiving and sending channel.

17. The system according to claim 16, wherein:
when a base station in the system is a distributed base station, the first radio frequency module is a first radio remote unit (RRU), the second radio frequency module is a second RRU, the first baseband module is a first baseband unit (BBU), and the second baseband module is a second BBU; and
when a base station in the system is a macro base station or a micro base station, the first radio frequency module is a first intermediate radio frequency unit, the second radio frequency module is a second intermediate radio frequency unit, the first baseband module is a first master control and baseband unit, and the second baseband module is a second master control and baseband unit.

18. The system according to claim 16, wherein the first baseband module is configured to:
control a correction reference signal to be transmitted between the first receiving and sending channel and the second receiving and sending channel;
obtain a compensation parameter of the channel response ratio of the second receiving and sending channel with respect to the channel response ratio of the first receiving and sending channel according to a transmission result of the correction reference signal, and
compensate a channel response of the second receiving and sending channel by using the compensation parameter, so that the channel response ratio of the second receiving and sending channel is consistent with the channel response ratio of the first receiving and sending channel.

19. The system according to claim 16, wherein an air interface coupling channel exists between the first cell of the first radio frequency module and the second cell of the second radio frequency module.

20. The system according to claim 16, wherein the second baseband module and the first baseband module are integrated as one baseband module.

* * * * *